(12) United States Patent
Masuda (10) Patent No.: US 7,765,198 B2
(45) Date of Patent: Jul. 27, 2010

(54) DATA PROCESSING APPARATUS, DATA PROCESSING METHOD, AND DATA PROCESSING SYSTEM

(75) Inventor: Yoshihiro Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 946 days.

(21) Appl. No.: 11/204,559

(22) Filed: Aug. 15, 2005

(65) Prior Publication Data

US 2006/0047642 A1    Mar. 2, 2006

(30) Foreign Application Priority Data

Aug. 27, 2004    (JP) .............................. 2004-248500

(51) Int. Cl.
*G06F 7/00* (2006.01)
*G06F 17/30* (2006.01)
(52) U.S. Cl. ...................................... 707/707; 707/770
(58) Field of Classification Search ...................... 707/3
See application file for complete search history.

(56) References Cited

U.S. PATENT DOCUMENTS

| | | | | | |
|---|---|---|---|---|---|
| 5,963,916 | A | * | 10/1999 | Kaplan | ........................ 705/26 |
| 6,044,047 | A | * | 3/2000 | Kulas | ....................... 369/34.01 |
| 6,502,194 | B1 | * | 12/2002 | Berman et al. | ................. 726/28 |
| 6,555,738 | B2 | * | 4/2003 | Hughes et al. | ................. 84/609 |
| 6,670,537 | B2 | * | 12/2003 | Hughes et al. | ................. 84/609 |
| 6,985,897 | B1 | * | 1/2006 | Abrahams | ........................ 707/4 |
| 2002/0023270 | A1 | * | 2/2002 | Thomas et al. | ................. 725/95 |
| 2002/0198789 | A1 | * | 12/2002 | Waldman | ...................... 705/26 |
| 2003/0126237 | A1 | * | 7/2003 | Tsuchiya | ..................... 709/220 |
| 2004/0034711 | A1 | * | 2/2004 | Hughes | ........................ 709/231 |
| 2004/0107821 | A1 | * | 6/2004 | Alcalde et al. | ................ 84/608 |
| 2004/0261040 | A1 | * | 12/2004 | Radcliffe et al. | ............ 715/840 |
| 2005/0027557 | A1 | * | 2/2005 | Kawakami et al. | ............. 705/1 |
| 2005/0038819 | A1 | * | 2/2005 | Hicken et al. | ............ 707/104.1 |
| 2006/0029230 | A1 | * | 2/2006 | Kihara et al. | ................ 380/269 |
| 2007/0043765 | A1 | * | 2/2007 | Chan et al. | ................ 707/104.1 |
| 2007/0180475 | A1 | * | 8/2007 | Tsuchiya | ...................... 725/61 |

FOREIGN PATENT DOCUMENTS

| | | |
|---|---|---|
| JP | 10-064245 | 3/1998 |
| JP | 2001-110171 | 4/2001 |
| JP | 2001-160261 | 6/2001 |
| JP | 2003-141855 | 5/2003 |
| WO | WO 02/099558 A2 | 12/2002 |

* cited by examiner

*Primary Examiner*—Kuen S Lu
*Assistant Examiner*—Binh V Ho
(74) *Attorney, Agent, or Firm*—Wolf, Greenfield & Sacks, P.C.

(57) ABSTRACT

A data processing apparatus is disclosed, that has a reading section, a transmission section, a reception section, and a search information storage section. The reading section reads data from a storage medium on which a plurality of songs of song data and song identification data that identify the plurality of songs of song data have been recorded. The transmission section transmits song identification data that have been read by the reading section to an external database. The reception section receives partial song data corresponding to the song identification information from the external database. The search information storage section stores the received partial song data.

14 Claims, 8 Drawing Sheets

| PERFORMANCE TIME X | ARTIST NAME | TITLE NAME | PARTIAL SONG DATA |
|---|---|---|---|
| 3M15S21F | a b c d | H I J K | D i |
| 5M 3S 11F | g h i j | O P Q R | D j |
| . | . | . | . |
| . | . | . | . |
| . | . | . | . |

Fig. 4

| BIT RATE | COMPRESSION SYSTEM | DATA AMOUNT | PERFORMANCE TIME Tx |
|---|---|---|---|
| 256 kbps | ATRAC 3 | 452 kbyte | 6M15S20F |
| 256 kbps | ATRAC 3 | 319 kbyte | 4M19S12F |
| 128 kbps | MP3 | 693 kbyte | 8M39S21F |
| . | . | . | . |
| . | . | . | . |

DATA PROCESSING APPARATUS, DATA PROCESSING METHOD, AND DATA PROCESSING SYSTEM

CROSS REFERENCES TO RELATED APPLICATIONS

The present invention contains subject matter related to Japanese Patent Application JP 2004-248500 filed in the Japanese Patent Office on Aug. 27, 2004, the entire contents of which being incorporated herein by reference.

BACKGROUND OF THE INVENTION

1. Field of the Invention

The present invention relates to a data processing apparatus, a data processing method, and a data processing system that allow a potable music reproducing device to search for a song.

2. Description of the Related Art

In recent years, portable reproducing devices that receive song data from Compact Discs (CDs) as music information sources and that allow the users to enjoy listening to music have been widely used. With the improvement of audio compression technology, a very large number of songs for example several hundred songs or several thousand songs of song data can be stored to a medium such as a Compact Disc-Recordable (CD-R) disc, a semiconductor memory, a small hard disc, or the like. The audio compression technology is for example Moving Picture Experts Group audio layer 3 (MP3), Adaptive Transform Acoustic Coding (ATRAC3, registered trademark), Adaptive Transform Acoustic Coding 3 plus (ATRAC3 plus, registered trademark), Advanced Audio Coding (AAC), Windows Media Audio (WMA, registered trademark).

Song data can be obtained from commercial CDs. In addition, using Electric Music Distribution (EMD), the user can obtain a wide variety of song data. The user selects and reproduces a desired song from many songs of song data recorded on a medium such as a CD-R disc on a portable reproducing device for example a portable CD player. When the user selects a desired song, he or she normally searches for the desired song corresponding to a song name and an artist name that are displayed on a liquid crystal display section of the main body of the player or a liquid crystal display section of a remote controller. In other words, while the user is watching data on the liquid crystal display, he or she searches for his or her desired song with indicators of a song name, an artist name, and so forth that he or she is watching.

The following patent document 1 describes a multi-CD player that pre-stores a part, for example the beginning, of each song of song data of each CD in a high speed memory and that has a scanning mode that allows the player to reproduce a part of the pre-stored song data at high speed. With the scanning mode, the user can quickly select a CD to reproduce song data. [Patent Document 1] Japanese Patent Laid-Open Publication No. 2000-123463

SUMMARY OF THE INVENTION

However, the user does not always know the song name and the artist name of the song that he or she want to reproduce. Thus, sometimes it may be difficult for the user to select a song with a song list and an artist list. In addition, while the user is riding in a crowed train, it may be difficult for him or her to search for his or her desired song on the liquid crystal display. When the user cannot search for his or her desired song, he or she may operate the player to reproduce each song from the beginning and select his or her desired song.

However, this song selection operation causes the player to access the CD whenever the player fast-forwards or rewinds a song. Thus, the user cannot quickly search for his or her desired song. If the user only knows an impressive part of his or her desired song, he or she has more difficulty to search for it.

The patent document 1 describes a multi-CD player that selects a CD to reproduce song data. Thus, the patent document 1 cannot be applied to a multi-CD player that selects a song to reproduce song data.

In view of the foregoing, it would be desirable to provide a data processing apparatus, a data processing method, and a data processing system that allow a plurality of songs to be easily and quickly searched for a desired one.

According to an embodiment of the present invention, there is provided a data processing apparatus that has a reading section, a transmission section, a reception section, and a search information storage section. The reading section reads data from a storage medium on which a plurality of songs of song data and song identification data that identify the plurality of songs of song data have been recorded. The transmission section transmits song identification data that have been read by the reading section to an external database. The reception section receives partial song data corresponding to the song identification information from the external database. The search information storage section stores the received partial song data.

According to an embodiment of the present invention, there is provided a data processing apparatus that has a reading section, a transmission section, a reception section, a search information storage section, and a control section. The reading section reads data from a storage medium on which a plurality of songs of song data and song identification data that identify the plurality of songs of song data have been recorded. The transmission section transmits song identification data that have been read by the reading section to an external database. The reception section receives position information that designates partial song data corresponding to the song identification information from the external database. The search information storage section stores the received position information. The control section reads data from the storage medium corresponding to the position information.

According to an embodiment of the present invention, there is provided a data processing method. Data are read from a storage medium on which a plurality of songs of song data and song identification data that identify the plurality of songs of song data have been recorded. Song identification data that have been read are transmitted to an external database. Partial song data corresponding to the song identification information are received from the external database. The received partial song data are stored.

According to an embodiment of the present invention, there is provided a data processing method. Data are read from a storage medium on which a plurality of songs of song data and song identification data that identify the plurality of songs of song data have been recorded. Song identification data that have been read are transmitted to an external database. Position information that designates partial song data corresponding to the song identification information is received from the external database. The received position information is stored. Data are read from the storage medium corresponding to the position information.

According to an embodiment of the present invention, there is provided a data processing system that has a data processing apparatus and an external database. The data processing apparatus is connected through a network. The external database has a database that correlates song identification information and partial song data. The data processing apparatus has a reading section, a transmission section, a reception section, and a search information storage section. The reading section reads data from a storage medium on which a plurality of songs of song data and song identification data that identify the plurality of songs of song data have been recorded. The transmission section transmits song identification data that have been read by the reading section to an external database. The reception section receives partial song data corresponding to the song identification information from the external database. The search information storage section that stores the received partial song data.

According to an embodiment of the present invention, there is provided a data processing system that has a data processing apparatus and an external database. The data processing apparatus is connected through a network. The data processing apparatus has a reading section, a transmission section, a reception section, a search information storage section, and a control section. The reading section reads data from a storage medium on which a plurality of songs of song data and song identification data that identify the plurality of songs of song data have been recorded. The transmission section that transmits song identification data that have been read by the reading section to an external database. The reception section that receives position information that designates partial song data corresponding to the song identification information from the external database. The search information storage section that stores the received position information. The control section that reads data from the storage medium corresponding to the position information.

According to embodiments of the present invention, while the user is listening to a part of a song that is being reproduced, he or she can easily and quickly search for his or her desired song without a visual sense. Thus, even if the user does not know the song name or artist name, he or she can acoustically search for his or her desired song.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawing, wherein similar reference numerals denote similar elements, in which.

DETAILED DESCRIPTION OF THE PREFERRED EMBODIMENTS

Figure 1:
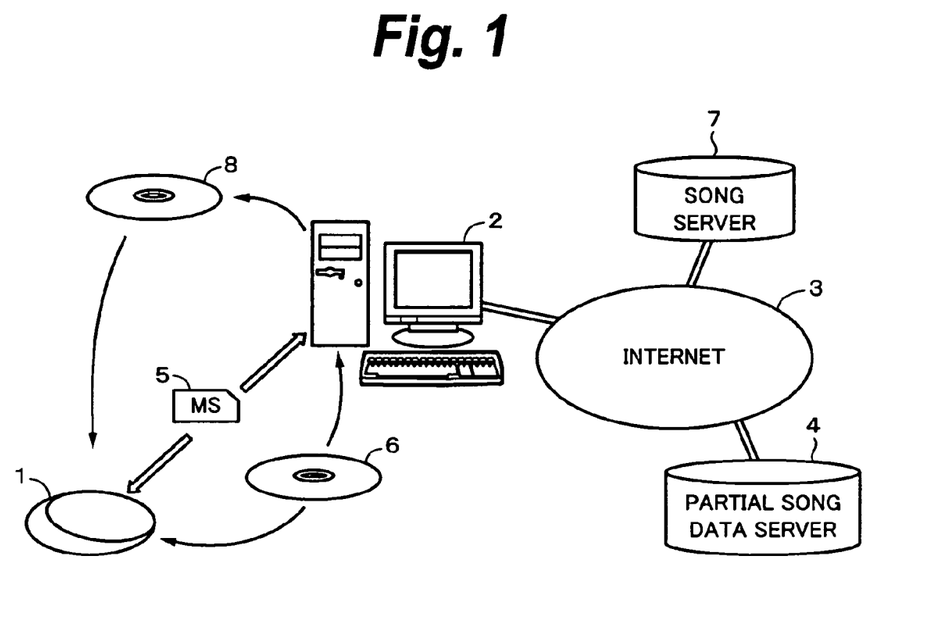
FIG. 1 is a schematic diagram showing the structure of a song search system according to an embodiment of the present invention.

Next, with reference to the accompanying drawings, embodiments of the present invention will be described. With reference to FIG. 1, an example of the overall structure of a song search system according to an embodiment of the present invention will be described.

In FIG. 1, reference numeral 1 represents a portable reproducing device for example a portable CD player. Reference numeral 2 represents a personal computer that is a network terminal. Hereinafter, the personal computer is referred to as the PC terminal. The portable CD player 1 can reproduce data from a CD 6 or a disc 8 produced by the PC terminal 2.

The PC terminal 2 can access a database of a partial song data server 4 of a web site through the Internet 3 as a network. A removable storage medium as a search information storage device for example a Memory Stick (trade name), a Universal Serial Bus (USB) memory, or the like (hereinafter referred to as the external memory 5) and the CD 6 can be inserted into the PC terminal 2.

When ripping software is installed to the PC terminal 2, it can read song data from the CD 6, perform a compression process for the song data, and store the compressed song data to a built-in hard disk of the PC terminal 2. The compression process is performed according to for example one of various systems such as ATRAC3 and MP3. In addition, the PC terminal 2 can access a song server 7 of a web site through the Internet 3 and receive song data from the song server 7. The song data that are distributed from the song server 7 have been normally compression-encoded and encrypted.

A desired song is selected from many songs stored in the hard disk of the PC terminal 2 and recorded on the disc 8 such as a CD-R disc as a song storage medium. When compressed song data are transferred from the PC terminal 2 to the disc 8, the number of transfer times thereof is restricted so as to protect their copyrights. When the disc 8 is inserted into the portable CD player 1, songs can be reproduced from the disc 8 by the portable CD player 1. Of course, the portable CD player 1 can reproduce songs from the CD 6.

When compressed song data recorded in the PC terminal 2 are recorded to the disc 8, the disc 8 may be inserted into the portable CD player 1 and the portable CD player 1 and the PC terminal 2 may be connected with a USB interface, a wireless interface, or the like so that the portable CD player 1 performs a recording operation for the disc 8. Instead, the portable CD player 1 may have an Internet connection function and a download function that downloads song data from a web site by the EMD. According to an embodiment of the present invention, instead of the portable CD player 1, a portable reproducing device having a built-in small hard disk, a Mini-Disc (MD) player, a semiconductor memory player, a cellular phone, or the like may be used.

The external memory 5 stores partial song data of song data stored in the hard disk of the PC terminal 2. The partial song data are parts of song data. Preferably, the partial song data are so-called catchy parts of song data and mean impressive and feature parts of song data.

When the removable external memory 5 is attached to the portable CD player 1, partial song data can be reproduced from the external memory 5. As will be described later, when the user operates the portable CD player 1 to reproduce partial song data from the external memory 5, he or she can easily search for his or her desired song.

Figure 2:
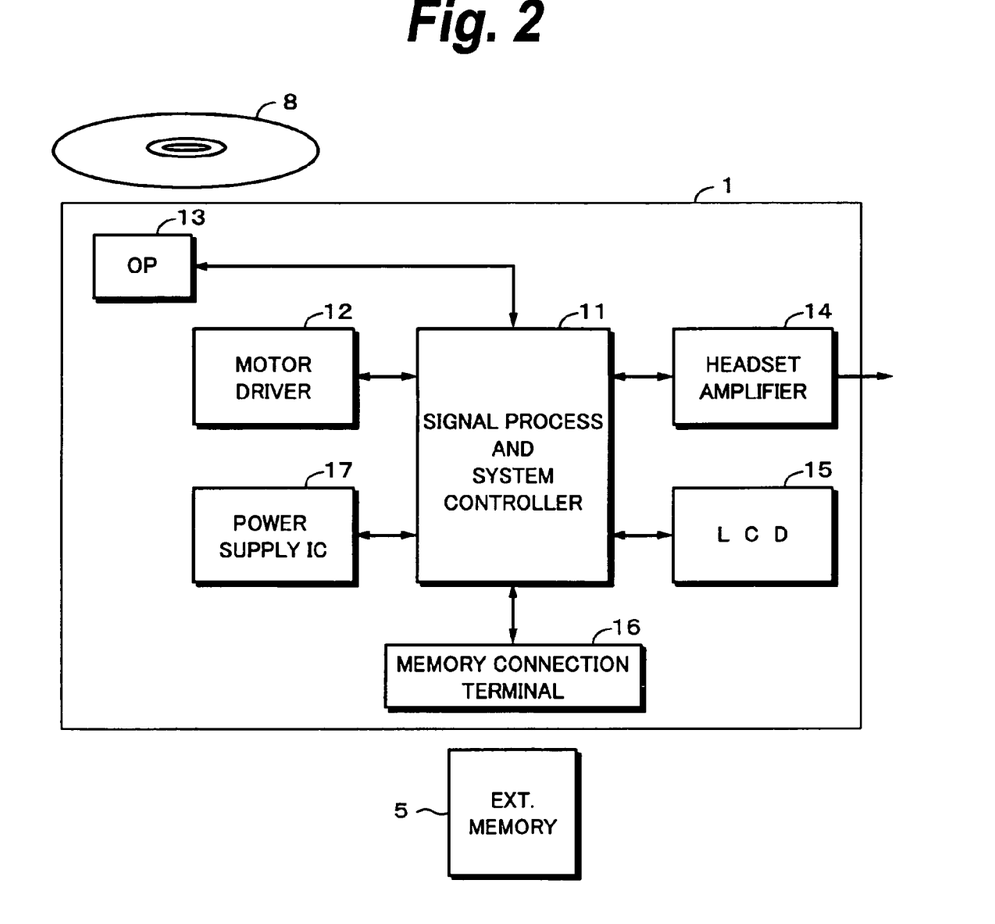
FIG. 2 is a block diagram showing a portable CD player.

FIG. 2 is a schematic diagram showing an example of the structure of the portable CD player. In FIG. 2, reference numeral 11 represents a signal process and system controller composed of an IC circuit. The signal process and system controller 11 controls each section of the portable CD player 1 and processes a reproduction signal. Reference numeral 12 represents a motor driver. The motor driver 12 is a circuit that drives a spindle motor and a pickup feed motor (not shown). The motor driver 12 is controlled by the signal process and system controller 11.

Reference numeral 13 represents an optical pickup (OP). The optical pickup 13 reproduces song data from the disc 8 (or the CD 6) and supplies a reproduction signal to the signal process and system controller 11. The signal process and system controller 11 performs reproduction processes such as a digital demodulation process and error correction code decoding process for the reproduction signal received from the optical pickup 13 and outputs a reproduction audio signal to a headset amplifier 14. When the reproduction signal has been compressed, the signal process and system controller 11 performs a decompression process for the reproduction signal. When the reproduction signal has been encrypted, the signal process and system controller 11 performs a decryption process for the reproduction data. A headset (not shown) is connected to the headset amplifier 14. With the headset, the user can listen to the reproduced song.

A liquid crystal display (LCD) 15 displays character information such as a song sequence number, an artist name, a song name, or the like. The LCD 15 is disposed in the main body of the portable CD player 1. In addition, a small LCD may be disposed on a remote controller (not shown). With keys (not shown) on the remote controller and the main body of the portable CD player 1, the user can input desired commands to the portable CD player 1. The external memory 5 is attached to the portable CD player 1 through a memory connection terminal 16. In addition, a power supply IC 17 is disposed in the portable CD player 1.

Figure 3:
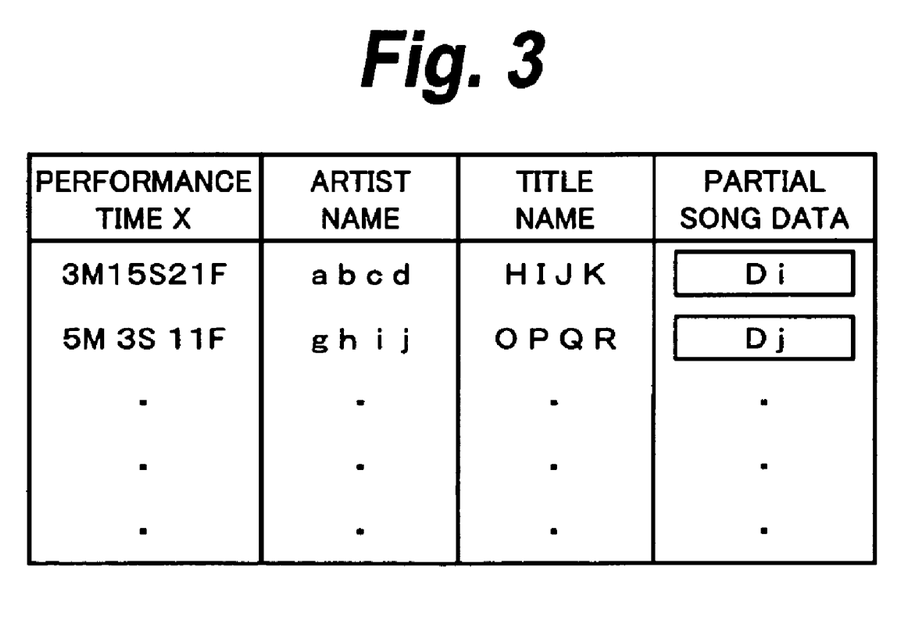
FIG. 3 is a schematic diagram describing a database provided in a partial song data server.

Next, with reference to FIG. 3, an example of the database of the partial song data server 4 will be described. As shown in FIG. 3, a performance time Tx of each song (for example, 3 M (minutes), 15 S (seconds), 21 F (frames)) is used as song identification data. Artist names, title names, and partial song data Di, Dj, . . . , and so forth of songs are stored in the database. The provider of the partial song data server creates the database and provides the information to the user with charge or without charge.

Data such as related sounds, characters, and so forth may be added to the partial song data, which are parts of songs. For example, commercial messages may be added to the partial song data.

As will be described later, according to an embodiment of the present invention, the user can select any part of a song and replace downloaded partial song data with the selected part. Instead, the user may add his or her own voice data to partial song data.

The partial song data are for example PCM song data. Partial song data that have been compressed according to one or a plurality of compression systems may be stored. When song data are transferred from a CD, the start time and the end time or the start time and the duration of partial song data may be defined with absolute time codes of the CD (album). When the duration of partial song data is fixed for 5 seconds, only the start time may be defined. In addition, the total performance time of an album may be used as identification data of an upper hierarchical level (each album) of song data.

The portable CD player 1 may reproduce song data distributed by the EMD, not from a CD. In this case, unlike a CD, the portable CD player 1 cannot obtain information about performance time Tx of each song in advance. However, the portable CD player 1 can obtain performance time Tx according to information associated with distributed song data.

Figure 4:
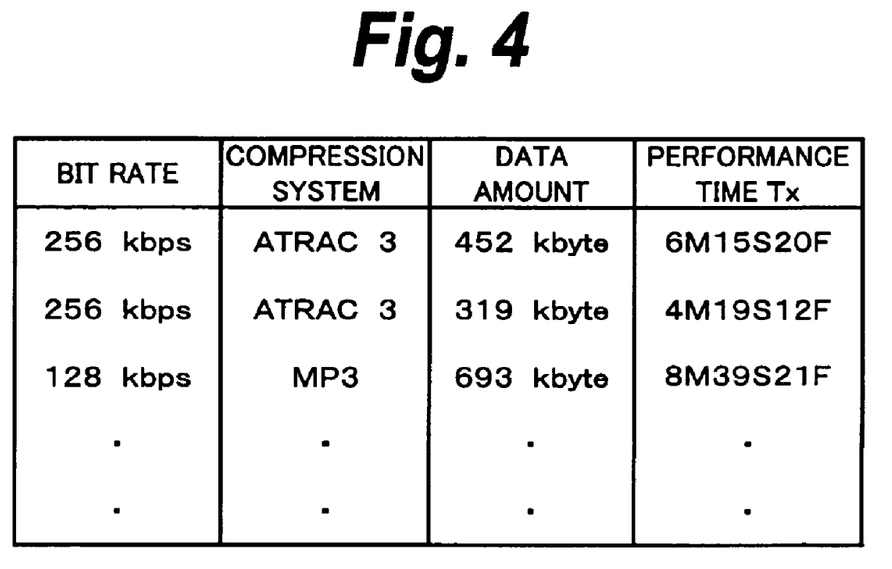
FIG. 4 is a schematic diagram describing song data downloaded by the EMD.

FIG. 4 shows examples of information associated with distributed song data and performance time Tx obtained from the associated information. When song data are distributed from the song server 7 to the PC terminal 2 by the EMD, the associated information can be generated. The associated information is for example the bit rate, the compression system, and the data amount of compressed song data. With the bit rate and the compression system, the compression rate of the song data can be obtained. With the data amount and the compression rate, the data amount of song data as PCM data, namely the performance time, can be obtained. The bit rate may be unconditionally decided according to the compression system or may be decided by the user when song data are downloaded. The performance time may be obtained by the partial song data server 4 rather than the PC terminal 2. In this case, the associated information may be transmitted to the partial song data server 4 to obtain the performance time.

In this manner, the performance time of downloaded song data can be obtained. With the performance time Tx as identification data, the database of the partial song data server 4 can be searched for the artist name, title name, and partial song data.

Since the performance time of one song corresponds to the data amount thereof, the performance time is included in the concept of the data amount. Thus, conversely, when information about the performance time is obtained, the performance time may be converted into a digital data amount (the number of bytes or the number of bits). In this case, the data amount obtained for the distributed song data can be used as identification data.

In addition to the data amount, the title name and the artist name may be used as identification data. Distributed song data normally contain the title name and artist name (not shown in FIG. 4). As identification data for distributed song data, the title name and artist name can be used. When a plurality of types of identification data such as the data amount, the title name, and the artist name are used, assuming that they are prioritized in the order, the goodness is obtained. Partial song data having the highest goodness are obtained from the database.

When the database is searched for desired partial song data, if the database does not store it, the partial song data server 4 does not transfer the partial song data to the PC terminal 2. When the database stores a plurality of desired partial song data and their goodness is almost the same, the partial song data server 4 transfers the plurality of desired partial song data to the PC terminal 2 so that the user can select one from them. The partial song data to be transferred have a structure similar to the folder structure of the CD loaded into the PC terminal 2. In other words, a folder is created corresponding to an album of a CD and partial song data are arranged in the order of song data on the CD.

The PC terminal 2 downloads partial song data from the partial song data server 4. Instead, the PC terminal 2 may download information of an artist name and a title name from the partial song data server 4. The downloaded partial song data are recorded on the hard disk. The partial song data are stored in the external memory 5 under the control of the PC terminal 2. The downloaded partial song data are for example PCM data. The PC terminal 2 compresses the PCM data according to a predetermined compression system and records the compressed data to the hard disk. The compressed partial song data are stored in the external memory 5.

Figure 5:
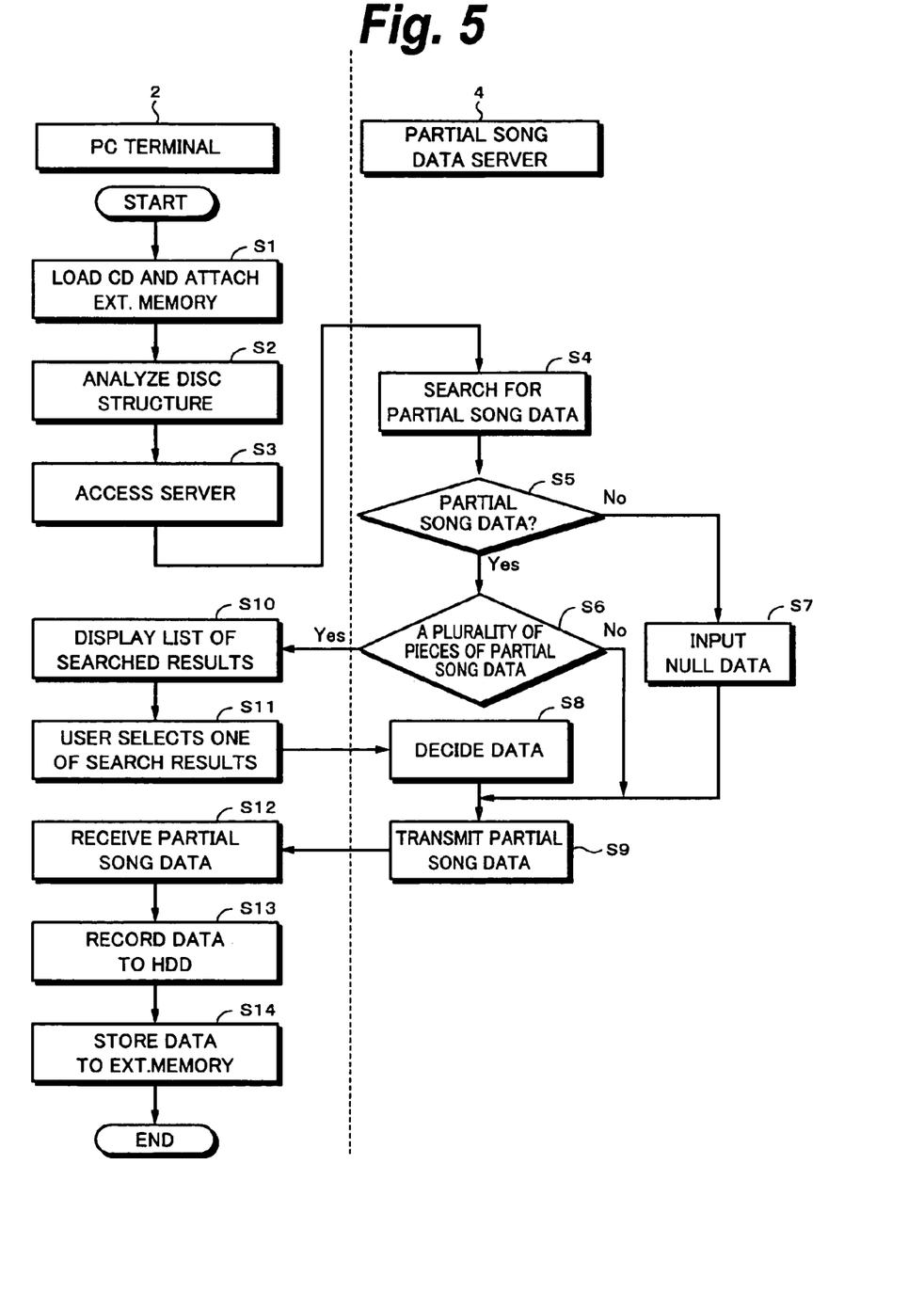
FIG. 5 is a flow chart showing an operation of a system that stores partial song data to an external memory.

Next, with reference to a flow chart shown in FIG. 5, a download process for partial song data according to an embodiment of the present invention will be described. It is assumed that the PC terminal 2 rips song data from the CD 6 will be described. In FIG. 5, the left side shows a process of the PC terminal 2, whereas the right side shows a process of the partial song data server 4.

At step S1, the music CD 6 is loaded into the PC terminal 2. In addition, the external memory 5 is attached to the PC terminal 2. When the CD 6 is loaded into the PC terminal 2, a management Table of Contents (TOC) recorded in the lead-in area of the CD 6 is read to the PC terminal 2.

At step S2, the PC terminal 2 analyzes the disc structure of the CD 6 that has been loaded thereinto. The PC terminal 2 analyzes the disc structure by reading the total performance time of the CD, the performance time of each song, and so forth from the TOC. The PC terminal 2 displays the analyzed results on the display device. The ripping process for song data recorded on the CD 6 and the download process for partial song data may be performed in any order. It is preferred that partial song data of all songs recorded on the CD 6 be downloaded before the song data are ripped from the CD 6.

At step S3, the PC terminal 2 accesses the partial song data server 4. The PC terminal 2 transmits analyzed data as the analyzed result of the CD 6 to the partial song data server 4. Specifically, the PC terminal 2 transmits data of the performance time of each song to the partial song data server 4. Instead, the PC terminal 2 may transmit the total performance time of the album to the partial song data server 4. If the PC terminal 2 has obtained the title name and the artist name of the CD 6 because it has a format of CD text, the PC terminal 2 transmits them as analyzed data to the partial song data server 4. The partial song data server 4 receives the analyzed data from the PC terminal 2.

At step S4, the partial song data server 4 collates the analyzed data of the CD 6 for example the performance time of the CD 6 with the performance time recorded in the database and searches the database for a song recorded in the database. As shown in FIG. 3, the database stores for example the performance time (data amount), the title name, the artist name, and so forth of each song.

At step S5, the partial song data server 4 determines whether the database stores the analyzed data of the CD 6. When the database stores partial song data corresponding to the determined result of the CD 6, the determined result at step S5 becomes Yes and the flow advances to step S6. When the database does not contain partial song data corresponding to the analyzed data of the CD 6, the determined result at step S5 becomes No and the flow advances to step S7.

At step S6, the partial song data server 4 determines whether the database contains a plurality of pieces of partial song data corresponding to the analyzed data of the CD 6, the flow advances to step S10. At step S10, the partial song data server 4 transmits the detected results to the PC terminal 2. The PC terminal 2 displays a list of obtained songs on the display device. At step S11, the user selects a desired song from the list on the display device. The PC terminal 2 transmits the selected result to the partial song data server 4.

The partial song data server 4 receives the selected result from the PC terminal 2 through the Internet 3. At step S8, the partial song data server 4 decides partial song data to be transmitted to the PC terminal 2.

When the partial song data server 4 has determined that the database does not store partial song data corresponding to a song recorded on the CD 6 at step S5, the flow advances to step S7. At step S7, the partial song data server 4 inputs null data that represent that the database does not contain corresponding partial song data. Thereafter, the flow advances to step S9. The null data are for example all 0 data that represent the database does not contain corresponding partial song data.

At step S9, the partial song data server 4 transmits partial song data to the PC terminal 2 through the Internet 3. The partial song data may contain null data. This applies to the following description. At step S12, the PC terminal 2 receives the partial song data. At step S13, the PC terminal 2 records the received partial song data to the hard disk.

At step S14, the PC terminal 2 stores the partial song data recorded on the hard disk to the external memory 5. When the partial song data are recorded and stored to the hard disk and the external memory 5, respectively, folders identified by CD identification data for example the total performance time of the CD are created and the partial song data are stored therein. The partial song data stored in the external memory 5 are compressed according to the same encoding method used for the portable CD player 1.

Instead, the user may operate the portable CD player 1 to create partial song data by extracting them from the CD 6 and store the created partial song data to the external memory 5 as partial song data of a corresponding song to the external memory 5. When the database does not contain partial song data corresponding to a song, they are replaced with partial song data that the user created. The user may create partial song data on the PC terminal 2.

When the received partial song data are data that define the start position and so forth of song data rather than a part of a real song, the portable CD player 1 reproduces the corresponding portion of the CD 6 and obtains the partial song data.

Next, with reference to FIG. 6, a flow chart of a reference process of the portable CD player 1 that references data recorded on a CD and partial song data will be described. At step S21, the external memory 5 is attached to the portable CD player 1. The music CD 6 or the disc 8 is loaded into the portable CD player 1. It is assumed that when the CD 6 is loaded into the portable CD player 1, it automatically starts the process.

At step S22, the portable CD player 1 analyzes the disc structure of the CD 6. The disc structure is analyzed by reading the total performance time of songs and the performance time of each song recorded on the CD 6 from the TOC, which is the management information recorded in the lead-in area of the CD 6.

At step S23, the portable CD player 1 searches the partial song data stored in the external memory 5 for those corresponding to the loaded CD 6. At step S24, the portable CD player 1 determines whether the external memory 5 store partial song data corresponding to the loaded CD 6. When the external memory 5 does not store partial song data corresponding to the CD 6, the determined result at step S24 becomes No and the flow advances to step S25.

At step S25, the portable CD player 1 inputs null data that represent that the external memory 5 does not store corresponding partial song data and stores the null data to the buffer memory that temporarily stores partial song data (at step S26). The null data are mute data or audio data that inform the user that the external memory 5 does not store corresponding partial song data. When the determined result at step S25 represents that the external memory 5 stores partial song data corresponding to the loaded CD 6, the flow advances to step S26. At step S26, the portable CD player 1 reads the partial song data to the buffer memory.

When the disc 8 is loaded into the portable CD player 1, it performs the same operation as the CD 6 is loaded. For example, partial song data corresponding to all songs recorded on the disc 8 or null data are stored in the external memory 5. In particular, the portable CD player 1 may directly access the external memory 5 without the buffer memory to read partial song data.

Figure 6:
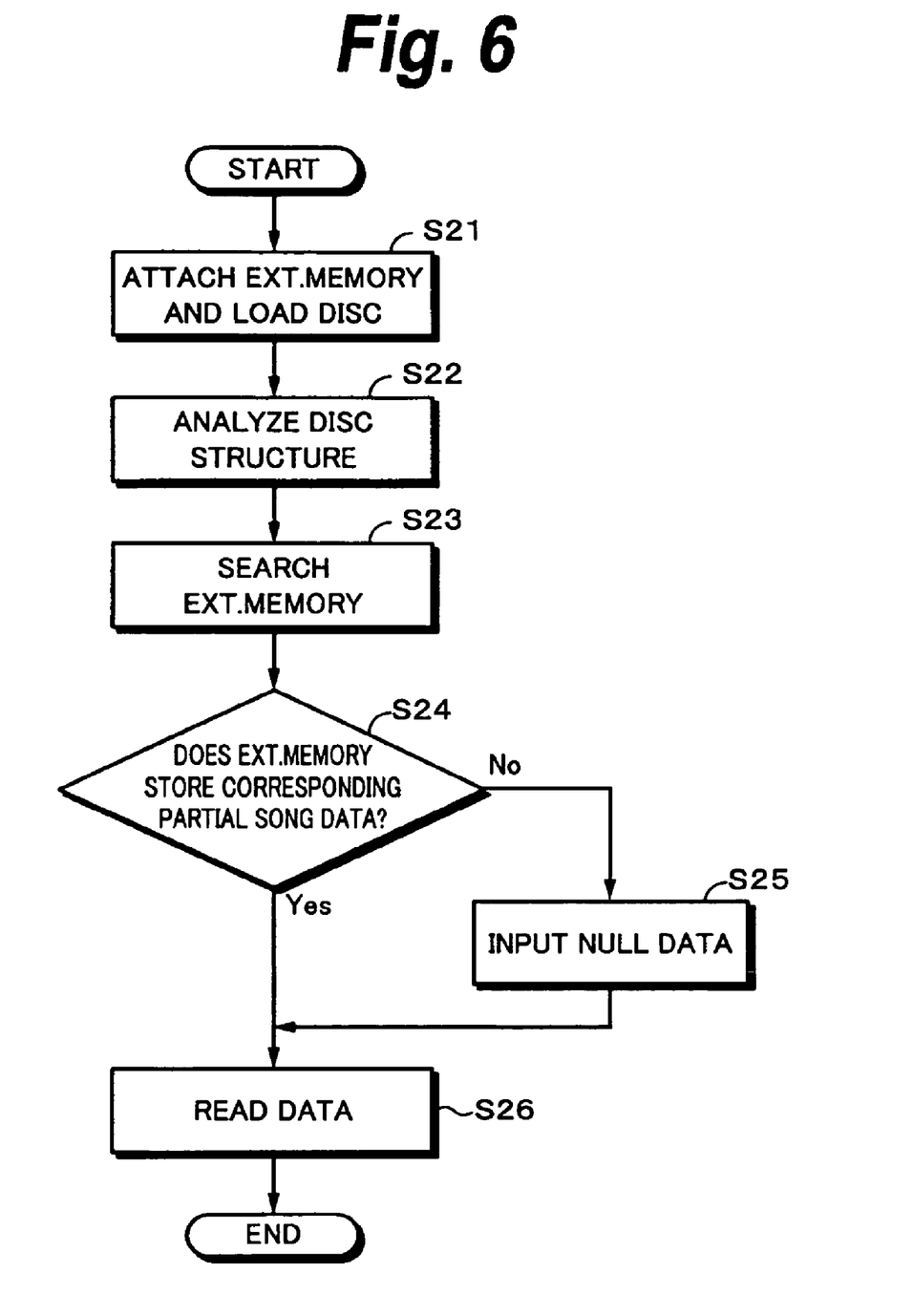
FIG. 6 is a flow chart showing an operation of the portable CD player into which a CD has been loaded and that reproduces partial song data therefrom.
Figure 7:
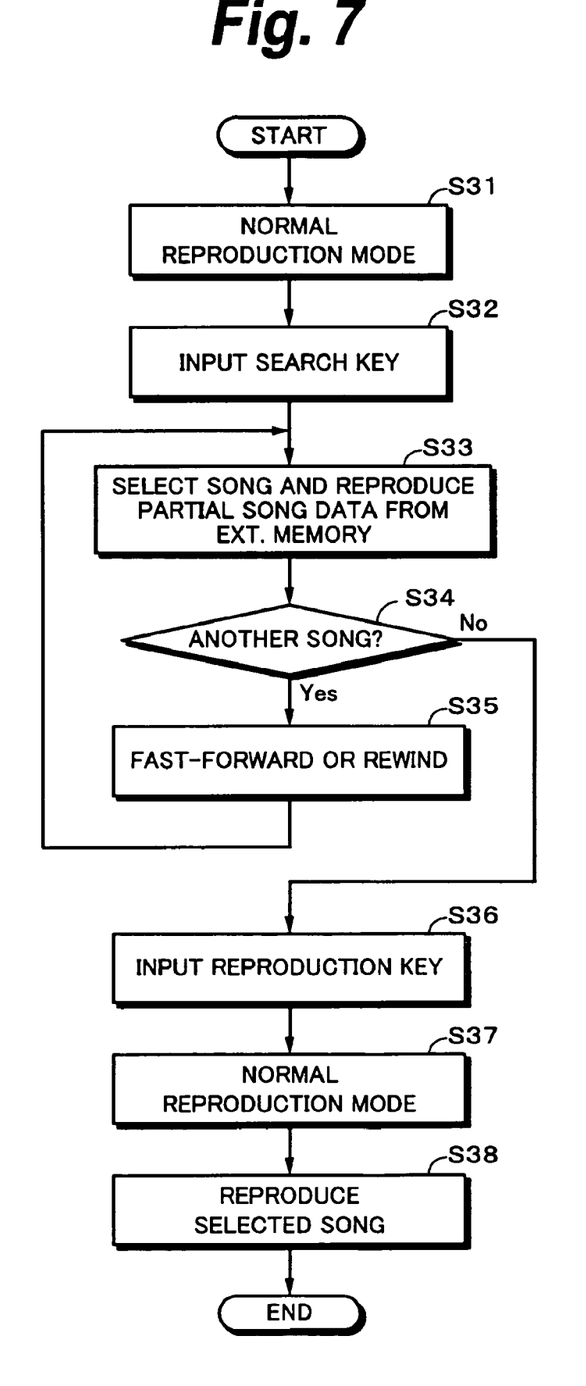
FIG. 7 is a flow chart describing switching between a search mode and a normal reproduction mode of the portable CD player.

FIG. 7 is a flow chart showing a process of the portable CD player 1 that performs after it has read partial song data corresponding to a song of the loaded CD 6 or disc 8 in the process shown in FIG. 6. It is assumed that the CD 6 has been loaded into the portable CD player 1. At step S31, the portable CD player 1 operates in the normal reproduction mode. The portable CD player 1 is reproducing a predetermined song from the music CD 6.

At step S32, a search mode input is preformed. When the user presses a predetermined button on the main body of the portable CD player 1 or the remote controller, the portable CD player 1 operates in the search mode. In the search mode, the portable CD player 1 displays a list of names of songs recorded on the music CD 6 on the LCD 15. In addition, the portable CD player 1 highlights or blinks the name of a song that it is currently reproducing on the LCD 15.

In the search mode, at step S33, the portable CD player 1 reproduces partial song data corresponding to a selected song for example a song that was reproduced in the immediately preceding normal reproduction mode. While the portable CD player 1 is reproducing the fourth song in the normal reproduction mode, if the normal reproduction mode of the portable CD player 1 is changed to the search mode, the portable CD player 1 reproduces partial song data corresponding to the fourth song. In the search mode, the portable CD player 1 stops the rotation of the disc so as to reduce the power consumption.

At step S34, the portable CD player 1 determines whether the user selects another song. When the partial song data that are being reproduced does not correspond to a song for which the user is searching or to which he or she wants to listen. In this case, the portable CD player 1 has determined that the user selects another song. In this case, the flow advances to step S35. At step S35, the portable CD player 1 performs a fast-forward operation that fast-forwards the current song to the next song or a reverse operation. Thereafter, the flow returns to step S33 (the portable CD player 1 reproduces partial song data). When the user operates a predetermined button of the main body of the portable CD player 1 or the remote controller, the portable CD player 1 performs the fast-forward operation or the reverse operation.

When the user has listened to the reproduced partial song data and decided to select the corresponding song, the flow advances to step S36. At step S36, the user inputs the reproduction key. At step S37, the portable CD player 1 changes the search mode to the normal reproduction mode. At step S38, the portable CD player 1 reproduces the selected song. When the portable CD player 1 changes the current song to another song, it may automatically and successively reproduce partial song data without performing the fast-forward operation and the reverse operation.

When partial song data are used as acoustic song search indicators, the user can search for his desired song without need to know the title name and the artist name thereof. When the user searches for his or her desired song while he or she is listening to songs, whenever the portable CD player 1 fast-forwards or rewinds a song, it accesses the CD. Thus, since the access time of the portable CD player 1 becomes long, its operability decreases. In contrast, according to an embodiment of the present invention, in the search mode, since the portable CD player 1 accesses the external memory 5 or the buffer memory and reproduces partial song data, as an advantage of the embodiment of the present invention over the related art, no time loss takes place. Thus, according to the embodiment of the present invention, the user can quickly search for his or her desired song. In addition, since the user does not need to watch data on the LCD or the like, he or she can easily search for his or her desired song in the situation that it is difficult for him or her to watch data on the LCD or the like.

Figure 8:
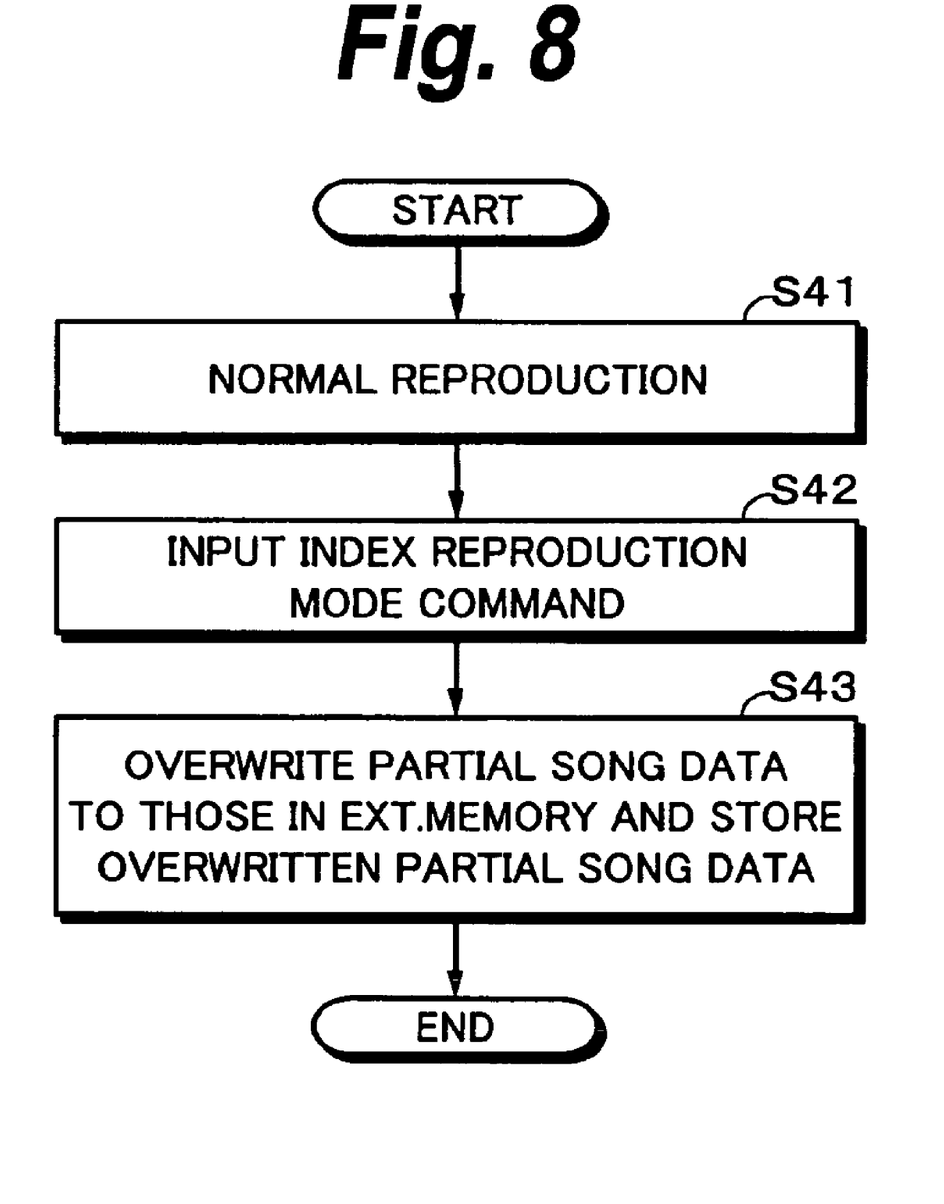
FIG. 8 is a flow chart showing an operation of the portable CD player that rewrites partial song data to the external memory.

FIG. 8 is a flow chart showing a process for which the user changes partial song data. At step S41, the portable CD player 1 operates in the normal reproduction mode. The portable CD player 1 reproduces songs from the music CD 6 or the disc 8.

At step S42, an index reproduction mode input is performed. When the user presses a predetermined button on the main body of the portable CD player 1 or the remote controller, the portable CD player 1 operates in the index reproduction mode. The index reproduction mode is a partial song data rewrite process. The partial song data rewrite process can be performed by not only the portable CD player 1, but the PC terminal 2.

In the index reproduction mode, while the user is listening to a song that the portable CD player 1 is reproducing from the disc, he or she presses an index button at the start position and the end position of his or her desired region. When the length of the region is fixed, the user designates only the start position thereof. Song data in the region designated at step S42 are temporarily stored in the memory.

At step S43, partial song data obtained in the index reproduction mode are rewritten on partial song data or null data corresponding to the same song stored in the external memory 5. In this case, the user may input his or her voice and add it to partial song data or store it instead of the partial song data.

According to an embodiment of the present invention, the portable music reproducing device is not limited to a portable CD player. Instead, the portable music reproducing device may be a portable Mini Disc (MD) player, a music player having a built-in hard disk drive (HDD), a cellular phone, a personal digital assistant (PDA), or the like.

In addition, the external memory 5 is not limited to a Memory Stick, but may be a removable storage device such as a USB memory.

In addition, with a semiconductor memory that is built in the portable CD player, partial song data may be obtained through the Internet.

It should be understood by those skilled in the art that various modifications, combinations, sub-combinations and alternations may occur depending on design requirements and other factors insofar as they are within the scope of the appended claims or the equivalents thereof.

What is claimed is:

1. A data processing apparatus, comprising:
    reading means for reading data from a storage medium on which a plurality of song data and song identification data that identify the plurality of song data have been recorded;
    transmission means for transmitting first song identification data that has been read by the reading means to an external database, the first song identification data being from among the song identification data and identifying a first song among the plurality of song data;
    reception means for receiving partial song data for the first song corresponding to the first song identification data from the external database;
    search information storage means for storing the received partial song data for the first song;

update means for designating a portion of the first song as new partial song data for the first song and replacing the received partial song data corresponding to the first song with the new partial song data for the first song in the search information storage means, the portion of the first song designated as the new partial song data for the first song being identified by at least a start time, the start time designating a time with respect to the first song at which the portion begins; and control means for reproducing partial song data stored in the search information storage means and reproducing the song corresponding to the new partial song data from the storage medium when the new partial song data is selected.

2. A data processing method, comprising the steps of:

reading data from a storage medium on which a plurality of song data and song identification data that identify the plurality of song data have been recorded;

transmitting first song identification data that has been read at the reading step to an external database, the first song identification data being from among the song identification data and identifying a same song among the plurality of song data;

receiving a plurality of partial song data from the external database, each of the plurality of partial song data corresponding to the same song identified by the first song identification data in the transmitting step, wherein each of the plurality of partial song data for the same song comprises a different feature part of said same song;

at a first time, designating a first partial song data of the plurality of partial song data as the partial song data representative of the same song;

at a second time, receiving a selection from a user of a selected partial song data among the plurality of partial song data for the same song and updating the partial song data by designating the selected partial song data as the partial song data representative of the same song; and storing the selected partial song data.

3. The data processing method as set forth in claim 2, further comprising the step of:

reproducing the selected partial song data and reproducing the song corresponding to the selected partial song data from the storage medium when the selected partial song data is selected for playback by the user.

4. A data processing system, comprising:

a data processing apparatus connected through a network; and an external database, wherein the external database comprises a database that correlates song identification data and partial song data, and wherein the data processing apparatus comprises:

reading means for reading data from a storage medium on which a plurality of song data and song identification data that identify the plurality of song data have been recorded;

transmission means for transmitting first song identification data that has been read by the reading means to an external database, the first song identification data being from among the song identification data and identifying a first song among the plurality of song data;

reception means for receiving partial song data for the first song corresponding to the first song identification data from the external database, wherein the partial song data comprises a designated feature part of said first song;

search information storage means for storing the received partial song data for the first song; and update means for designating a portion of the first song as new partial song data for the first song and replacing the received partial song data corresponding to the first song with the new partial song data for the first song in the search information storage means, the portion of the first song designated as the new partial song data for the first song identified by at least a start time, the start time designating a time with respect to the first song at which the portion begins.

5. A data processing apparatus, comprising:

a reading section that reads data from a storage medium on which a plurality of song data and song identification data that identify the plurality of song data have been recorded;

a transmission section that transmits first song identification data that has been read by the reading section to an external database, the first song identification data being from among the song identification data and identifying a first song among the plurality of song data;

a reception section that receives partial song data for the first song corresponding to the first song identification data from the external database, wherein the partial song data comprises a designated feature part of said first song;

a search information storage section that stores the received partial song data for the first song; and an update section for designating a portion of the first song as new partial song data for the first song and replacing the received partial song data corresponding to the first song with the new partial song data for the first song in the search information storage section, the portion of the first song designated as the new partial song data for the first song identified by at least a start time, the start time designating a time with respect to the first song at which the portion begins.

6. A data processing apparatus, comprising:

a reading section that reads data from a storage medium on which a plurality of song data and song identification data that identify the plurality of song data have been recorded;

a transmission section that transmits first song identification data that has been read by the reading section to an external database, the first song identification data being from among the song identification data and identifying a first song among the plurality of song data;

a reception section that receives partial song data for the first song corresponding to the first song identification data from the external database;

a search information storage section that stores the received partial song data for the first song;

an update section for designating a portion of the first song as new partial song data for the first song and replacing the received partial song data corresponding to the first song with the new partial song data for the first song in the search information storage section, the portion of the first song designated as the new partial song data for the first song identified by at least a start time, the start time designating a time with respect to the first song at which the portion begins; and a control section that reproduces partial song data stored in the search information storage section and reproducing the song corresponding to the new partial song data from the storage medium when the new partial song data is selected.

7. The data processing apparatus as set forth in claim 6, further comprising:
   an obtaining section for obtaining the song identification data of the plurality of song data from the storage medium when it is loaded into the data processing apparatus.

8. The data processing apparatus as set forth in claim 6, wherein the song identification data is the data amount of a song.

9. The data processing apparatus as set forth in claim 6, wherein the song identification data is the performance time of a song.

10. The data processing apparatus as set forth in claim 6, wherein the search information storage section is a removable storage device.

11. The data processing apparatus as set forth in claim 6, wherein the partial song data for the first song is compressed and stored according to a compression encoding system by the search information storage section.

12. The data processing apparatus as set forth in claim 11, wherein the plurality of song data is compressed and stored according to the compression encoding system.

13. The data processing apparatus as set forth in claim 6, wherein the partial song data for the first song is received from the external database through a network.

14. The data processing apparatus of claim 6, wherein the new partial song information for the first song is further identified by an end time, the end time designating a time with respect to the first song at which the portion ends.

* * * * *